Figure 1:
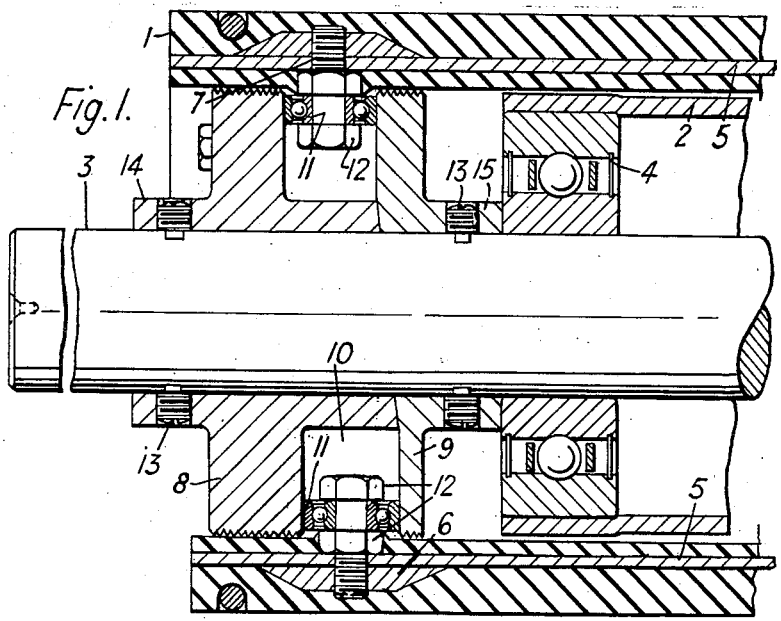

Sept. 24, 1963 E. WILFORD 3,104,445
WEB STRETCHING DEVICE AND METHOD
Filed March 14, 1960 4 Sheets-Sheet 1

ERNEST WILFORD Inventor

By
Mead, Browne, Schuyler & Beveridge Attorney

Sept. 24, 1963 E. WILFORD 3,104,445
WEB STRETCHING DEVICE AND METHOD
Filed March 14, 1960 4 Sheets-Sheet 2

ERNEST WILFORD Inventor

By
Mead, Browne, Schuyler + Beveridge Attorneys

Sept. 24, 1963   E. WILFORD   3,104,445
WEB STRETCHING DEVICE AND METHOD
Filed March 14. 1960   4 Sheets-Sheet 3

ERNEST WILFORD
Inventor

By
Mead, Browne, Schuyler & Beveridge   Attorney

United States Patent Office 3,104,445
Patented Sept. 24, 1963

3,104,445
WEB STRETCHING DEVICE AND METHOD
Ernest Wilford, Baildon, England, assignor to The Bradford Dyers' Association Limited
Filed Mar. 14, 1960, Ser. No. 14,787
Claims priority, application Great Britain Mar. 18, 1959
4 Claims. (Cl. 26—64)

This invention relates to devices for and methods of stretching long lengths of materials.

When textile fabrics or other non-rigid materials, e.g. paper, are being treated in the piece it is necessary to provide devices by which the fabric may be stretched transversely so as to maintain it in its full width and so as to prevent longitudinal crimping. All the devices in use for this purpose have drawbacks.

In some known devices the weftwise stretching of a fabric is effected by causing the fabric to travel in close frictional contact with a roller that presents a surface which is axially extensible and which is alternately axially stretched and relaxed as the roller rotates. If the fabric first makes contact with a relaxed part of the surface of the roller it is stretched weftwise as the roller turns. The extent of the stretching can be varied by varying the arc through which the fabric travels in engagement with the roller. In these known devices, the surface of the roller either is a rubber sleeve surrounding a series of springs parallel to the axis, that is to say, is continuous circumferentially, or is a series of rubber bars carried by a rigid roller, that is to say, is discontinuous circumferentially. The ends of the springs or the ends of the bars are held and moved axially outwards and inwards by swashplates or other mechanism as the roller rotates. In practice it is found that most of the extension and contraction takes place close to those ends, i.e. outside the area engaged by the fabric, and so is ineffective. The reason is that the fabric resists extension and through its frictional engagement with part of the roller surface causes that part to resist extension also, so that the extension takes place largely or even wholly over the lengths of the springs or bars which are not thus restrained by the fabric.

The principal object in this invention is to provide an improved device in which the axial extension of the surface of a roller takes place wholly throughout the part of the surface engaged by a fabric or other material.

Another object is to provide an improved method of stretching a material.

In my invention a central length of roller surface subjected to alternate axial extension and relaxation during rotation is elastic and is long enough to accommodate the total amount of stretch and the two end parts are substantially inelastic, so that stretching must take place in the central length. This length should be axially shorter than the width of the fabric so that all the surface on each side of it is substantially inextensible. If the central length is a little longer than the width of the fabric there is still considerable advantage in comparison with the known devices discussed above. If, however, there is any substantial extensible length of surface on each side of the fabric, all the stretching may take place in these unrestrained lengths and the device is as ineffective with the fabric in question as the known devices.

A feature of the invention is therefore a method in which the material is caused to travel in frictional contact with a moving surface that is alternately transversely stretched and relaxed throughout a length that lies wholly within the width of the material.

Figure 2:
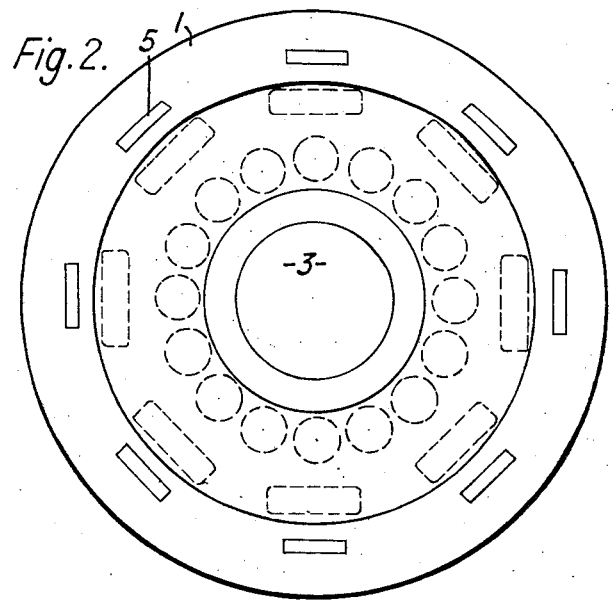
Figure 3:
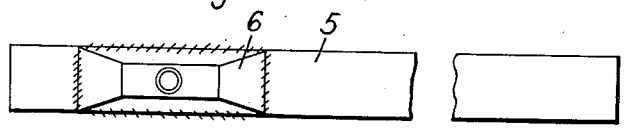
Figure 6:
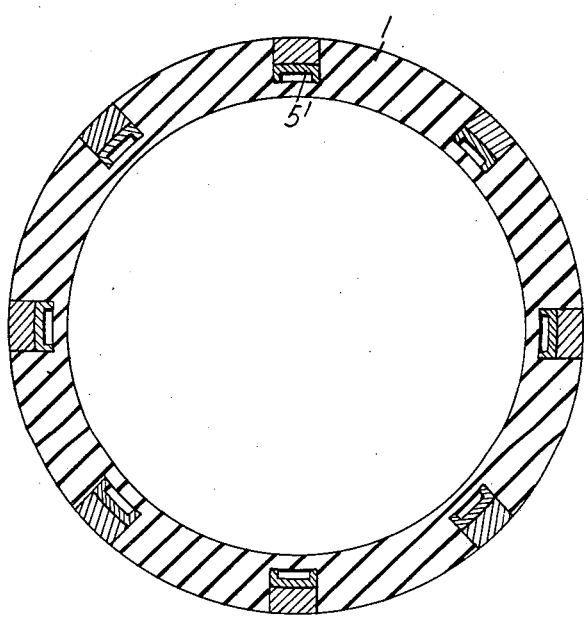
Figure 4:
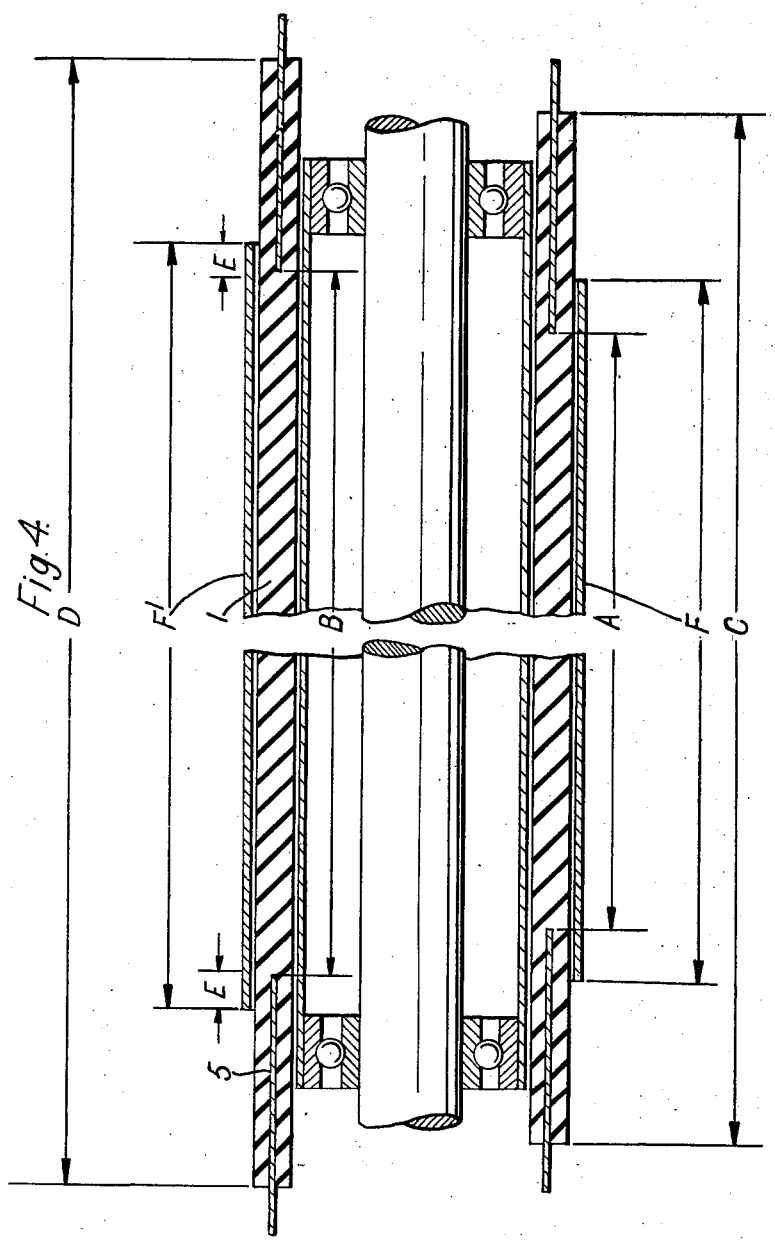
Figure 5:
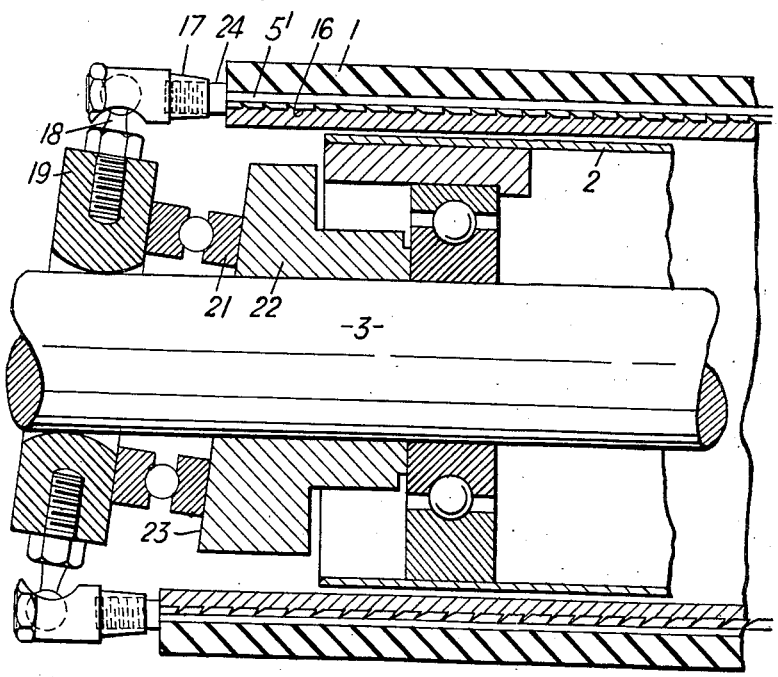

My invention will be more clearly understood from the following description, taken in conjunction with the accompanying drawings, in which:

FIGURE 1 is an axial section through one device, according to my invention;
FIGURE 2 is an end elevation of this device;
FIGURE 3 is a plan of one restraining strip;
FIGURE 4 is a diagram illustrating the operation;
FIGURE 5 is an axial section through one end of another device; and
FIGURE 6 is a cross-section through the sleeve of the device shown in FIGURE 5.

In the device shown in FIGURES 1 to 3 a roller comprises a rubber sleeve 1 surrounding a rigid tube 2 which in turn surrounds a shaft 3 on which it is carried by ball-races 4 which grip the tube 2 and shaft 3 tightly. There is a small clearance between the sleeve 1 and tube 2, to enable relative axial movement to take place. The tube forms a rigid support for the sleeve when this tends to move radially under the pressure of a fabric that is passing around the roller under tension.

Flat metal strips 5 are embedded in and extend axially along the end part of each sleeve from the outer end. Close to each end there is a hole in each of these strips, and a metal block 6 with a central hole is welded to the strip so that the holes in the block and strip register. The hole in the block is tapped to receive a threaded stud 7.

As an example the sleeve may be of rubber ½ inch thick radially and as shown may receive eight flat strips at uniform angular spacing at each end, each strip being of metal ⅜ inch wide, 18 inches long and 1/16 inch thick. One way of producing the sleeve with the embedded strips is to put a layer of rubber on a mandrel; put the strips on this layer; hold them in position, e.g. by splined rings surrounding the mandrel; insert the studs 7 into and through the blocks 6; apply further layers of rubber over the strips to build up the sleeve to the required thickness; and bake the assembly to bind the rubber to and around the strips.

The shaft 3 projects beyond the tube 2 at each end, and each projecting end of the shaft is surrounded by two annular plates 8 and 9 which present complementary cam faces to one another so that an annular slot 10 is left between them and has a central plane that is inclined, and not perpendicular, to the axis of the shaft. Each stud 7 carries a ball-race 11 between two nuts 12. The circumferential surfaces of the plates 8 and 9 are grooved so as to grip the inner surface of the sleeve 1 firmly. The plates 8 and 9 are fixed to the shaft 3 by screws 13 which pass through threaded openings in flanges 14 and 15 on the plates 8 and 9 respectively into recesses in the shaft.

In operation the shaft 3 is stationary and the roller composed of the tube 2 and sleeve 1 turns around it. The ball-races 11 run through the slot 10 with the result that each stud moves axially inwards and outwards and the sleeve is alternately extended and relaxed. If the fabric first makes contact with the sleeve at the point of maximum relaxation and travels in contact with it through 180° to the point of maximum extension, it will be subjected to the maximum weftwise stretching. If this is not required the arc of contact between the fabric and the sleeve may be reduced.

The operation is illustrated by FIGURE 4, which shows a roller having a sleeve 3 feet 6 inches long axially in its unstretched state and strips each 4½ inches long, so that a central unconstrained length A of 33 inches is left. This roller is shown in engagement with a fabric F 35½ inches wide. The total axial stretch (imparted by the mechanism of the kind shown in FIGURE 1) is ½ inch at each end, i.e. 1 inch in all, so that the central length is stretched from the length A (33 inches) to the length B (34 inches) and the whole sleeve from the length C (42 inches) to the length D (43 inches) in turning through 180°. The fabric moves axially with the sleeve over its whole width until the elastic limit of the fabric is reached, and it has been stretched to the width F' (36 inches). Thereafter there will be slip between the fabric and sleeve. Crimps in the width B of the fabric are removed in the stretching process, and it is also found that crimps in the edge lengths E are largely eliminated during the slip between the fabric and the sleeve.

The roller shown in FIGURE 4 may be used with narrower fabrics, say no more than 27 inches wide, if the tension applied to the fabric, and therefore the frictional grip of the fabric or the sleeve, is not high, e.g. the fabric is spun rayon to which high tension is not applied. If, however, the fabric is cotton of the kind usually run under high tension, there will be such frictional engagement between the sleeve 1 and the tube 2 as to prevent much, if any, stretch over the length engaged by a 27 inch fabric and all the stretch may take place in the unconstrained lengths outside the edges of the fabric. However the method of the invention can be applied to such a 27 inch fabric by using an apparatus in which the strips are longer than those shown, e.g. strips of length such that the central unconstrained length A becomes 18 inches and increases to a length B of 19 inches. Fabrics much wider than that shown, even 108 inches wide, may be effectively stretched with a roller of adequate overall length and the same unconstrained central length of 33 inches.

The roller may be driven by the fabric itself or through frictional contact with a plain driven roller. If more than one roller is required to obtain the necessary stretching of the fabric, as in chainless mercerising, the number of rollers can be arranged in close proximity and the whole group driven by one plain driving roller.

FIGURES 5 and 6 show a construction differing in several respects from that shown in FIGURES 1 to 3. As before, there is a shaft 3 surrounded by a tube 2 and a rubber sleeve 1, but metal strips 5' with serrations 16 are used and their outer ends are rigid with threaded end pieces 24. These end pieces enter and engage metal connecting pieces 17 forming parts of universal joints completed by radial arms 18 extending from swashplates 19. These swashplates are rings separated by thrust-races 21 from an annular fitting 22 that is fixed to the shaft and presents a cam face 23. The connecting pieces 17 are screwed over the end pieces 24 to an extent such that the sleeve is under tension and in consequence the rings are urged at all times towards the faces 23.

As the roller turns the rings 19 turn with it, but each remains in the plane of the face against which it is urged, so that the axial position of the end of each strip continuously changes.

The sleeves need not be of rubber, but may be of other elastic material, e.g. nylon or neoprene, and the strips need not be of metal, but may be of other non-elastic material.

Finally the surface of the roller may be circumferentially discontinuous, and this may be advantageous if the material that is being stretched tends to adhere very tightly to the surface of the roller.

I claim:
1. In a device for transverse stretching of a material in the piece comprising a rotatable roller having an axially extensible surface and means for alternately axially stretching and relaxing said extensible surface as the roller rotates, said device having the disadvantage, when said roller is in contact with a material having a width substantially less than the axial length of the extensible surface, of having the stretching of said extensible surface occurring at the portions of said surface which are out of contact with said fabric, with a subsequent failure to impart the necessary stretching to the fabric, the improvement whereby the transverse stretching of said fabric is fully accomplished comprising having said axially extensible surface disposed on the central portion of said roller, said surface having an axial length of less than the width of the fabric to be stretched thereby, the end portions of said roller adjoining said extensible central portion of said roller being substantially inelastic.

2. The device defined in claim 1 wherein the roller having an axially extensible surface on its central portion comprises an elastic sleeve surrounding a rigid tube, a plurality of spaced, non-elastic strips extending axially along and anchored throughout their whole length to each end of said elastic sleeve, said axially extensible surface being defined by that portion of said elastic sleeve located between the inner ends of said strips, and means on said strips to provide reciprocating axial movement thereof relative to said rigid tube as said roller is rotated, whereby said extensible surface is alternately stretched and relaxed.

3. The device defined in claim 2 wherein said strips are embedded in and bonded to said sleeve.

4. A method of transversely stretching material in the piece comprising causing the material to pass over an arc of a rotating roller having an elastic surface by which the material is gripped solely by friction and axially stretching the surface while it is in contact with the material and relaxing it again while it is out of contact with the material as the roller rotates, the stretching and relaxing of the surface taking place throughout an axial length that lies wholly within the width of the material.

References Cited in the file of this patent

UNITED STATES PATENTS

| | | |
|---|---|---|
| 1,161,950 | Midgley | Nov. 30, 1915 |
| 1,642,496 | Hinnekens | Sept. 13, 1927 |
| 1,701,472 | Dismore | Feb. 5, 1929 |
| 1,900,435 | Desautels | Mar. 7, 1933 |
| 2,969,578 | Lembo | Jan. 31, 1961 |

FOREIGN PATENTS

| | | |
|---|---|---|
| 137,779 | Australia | June 28, 1950 |
| 328,045 | Great Britain | Apr. 24, 1930 |